J. GIEBEL AND F. H. ZIMMERMAN.

METHOD OF MANUFACTURING DIES AND A HUB OR SINKER THEREFOR.

APPLICATION FILED MAY 16, 1919.

Reissued Apr. 6, 1920. 14,835.

INVENTOR

Julius Giebel,
Fred H. Zimmerman,
By Brown, Brown & Crompton,
Their attys.

UNITED STATES PATENT OFFICE.

JULIUS GIEBEL AND FRED H. ZIMMERMAN, OF FREMONT, OHIO; SAID GIEBEL ASSIGNOR TO THE HERBRAND COMPANY, OF FREMONT, OHIO.

METHOD OF MANUFACTURING DIES AND A HUB OR SINKER THEREFOR.

14,835. Specification of Reissued Letters Patent. Reissued Apr. 6, 1920.

Original No. 1,247,524, dated November 20, 1917, Serial No. 140,594, filed January 4, 1917. Application for reissue filed May 16, 1919. Serial No. 297,668.

*To all whom it may concern:*

Be it known that we, JULIUS GIEBEL and FRED H. ZIMMERMAN, both citizens of the United States of America, residing at Fremont, in the county of Sandusky and State of Ohio, have invented a certain new and useful Method of Manufacturing Dies and a Hub or Sinker Therefor, of which the following is a specification.

This invention relates to the making of dies and particularly to the making of drop forging dies, and also to the construction of hubs, sinkers or master formers for use in sinking or forming a design in intaglio upon the surface of a suitably prepared block of metal.

The object of this invention is the provision of an improved method of making dies particularly for use in drop forging, and also the provision of an improved hub, sinker or master former for making such dies, whereby a material saving in time, labor, material and expense is effected in the making of such dies, and the liability of mistakes and errors minimized, thereby enabling the employment of skilled labor in the manufacture of such dies to be in some measure dispensed with. Further advantages of our invention are that it makes every impression uniform, simplifies the finishing of the die and insures sharp corners or edges on the finished die.

Further objects and advantages of the invention will be apparent to persons skilled in the art from the following description thereof.

Figure 1:
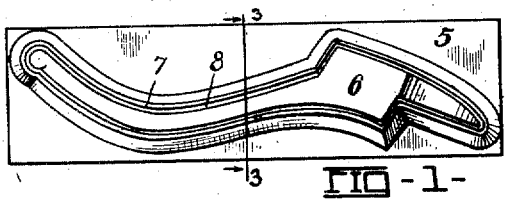
Figure 3:
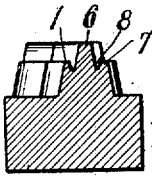
Figure 2:
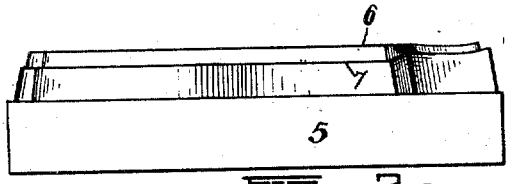
Figure 4:
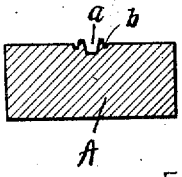
Figure 6:
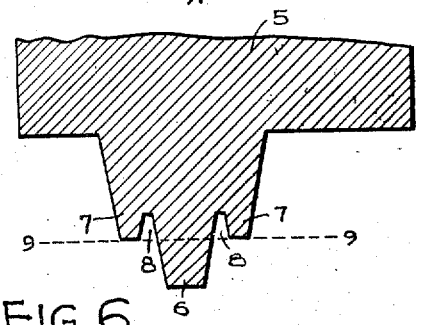
Figure 5:
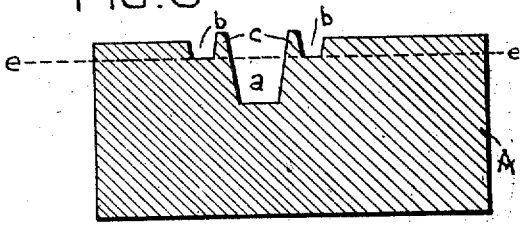
Figure 5:
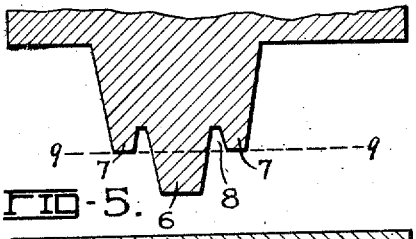
Figure 7:
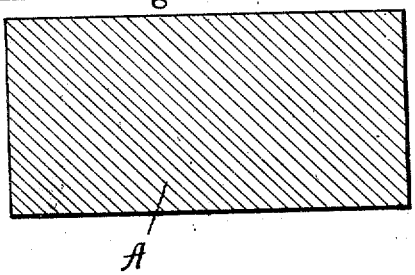
Figure 7:
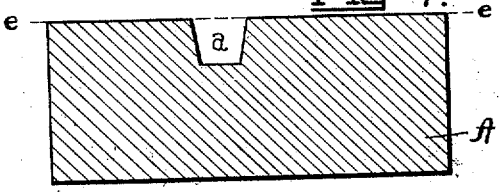

In the accompanying drawings,

Figure 1 is a plan view of a hub or sinker constructed in accordance with the invention. Fig. 2 is a side elevation thereof. Fig. 3 is a transverse vertical section therethrough, Fig. 4 is a sectional view of a die formed by the tool before the surface of the same is dressed off. Fig. 5 is an enlarged section of the hub or sinker taken on a line 3—3 in Fig. 1, and in operative relation to a plain die block in similar section. Fig. 6 is a similar view thereof after the hub or sinker has been lowered to sink its impression into the die block and again raised, and Fig. 7 is a section of the die block faced off to the depth of the gage line and in usable condition.

Like reference characters designate corresponding parts in all of the figures of the drawings.

The hub or sinker is a tool made in the shape of the article that is to be stamped out by the finished die. In making the die, the block of which the die is to be made is heated to the proper temperature and the hub or sinker is forced or driven into it leaving an impression the shape of the hub or sinker.

Heretofore it has been customary to force the hub or sinker into the block of steel to a depth determined more or less by guess work and then dress off the top of the die block to secure an impression of the proper depth. With the hubs or sinkers heretofore employed it has been difficult to secure sharp edges at the upper face of the die. By the employment of the hub or sinker constituting the present invention sharp edges are secured at the upper face of the die and such indications are formed upon the upper face of the die block as will indicate to the workman the exact point to which the top of the die block is to be finished.

Referring to the accompanying drawings, 5 designates a suitable metal block having formed in cameo upon one of its faces any suitable shape or pattern such as is indicated at 6, and which shape, when driven into a heated block of metal A from which the die is to be formed, is adapted to produce an impression or cavity *a* therein which corresponds to the configuration of the shape.

The present invention resides particularly in forming a ledge 7 around the base portion of the shape 6, which ledge substantially conforms to the configuration of the shape 6 and this ledge is separated from the shape by a preferably continuous gutter 8. The ledge 7 and the gutter 8 are formed in the block 5 at the base of the shape 6, with the outer edge of the ledge 7, particularly for the purposes hereinafter described, terminating in coinciding relation with the center or base line of the adjacent portion of said shape, which center or base line is dotted in the drawings and designated 9. It will be understood that if the die is of the "lock" type, as illustrated in Figs. 1 and 2, the outer edge of the ledge 7 will follow and conform to the irregular lock center or base line of the shape 6. The center or base line of a hub or sinker is understood by manufacturers thereof as the imaginary line which determines the true base line of the shape of the hub or sinker and which when driven into a die block A coincides with the dressing-off line of the block face. The die when made and dressed off forms one of a pair of dies and the division or parting line therebetween is generally referred to as the "center line". The term "center line", as used herein, will therefore be understood as referring to the imaginary base line of the shape 6, which line coincides with the surface or parting line of the finished or dressed-off face of a die block when a hub or sinker is passed therein.

In operation, the presence of the gutter 8 in the hub or sinker permits the hot metal displaced on the surface of the block A at *b* by the hub or sinker ledge 7 to flow into said gutter and thus form a continuous slightly elevated ridge *c* around the impression formed intaglio in the die block A by the shape 6. For this purpose the outer wall of the gutter 8 is preferably inclined or extended away from the inner wall thereof to cause a forcing of the displaced material toward the impression edge.

The ledge 7 in addition to serving as an element for displacing metal in the face of the die block A around the impression *a* and causing the displaced metal to flow around said impression to provide it with a sharp well defined marginal edge, also acts as a marker to form the continuous recess or depression *b* in the face of the die block around the outer side of the edge ridge *c*, the bottom of such recess coinciding exactly with the center or parting line *e* of the formed impression, the same as the outer edge of the ledge 7 in the hub or sinker block 5 coincides with the center line 9 of the shape 6. The gage line thus formed in the face of the die block indicates to the mechanic the exact depth to which he is to remove the superfluous metal from the die face. The ridge *c* thrown up by the action of the ledge or marker 7 forms a part of this superfluous metal and is removed therewith. The die with its face dressed is shown in Fig. 8.

The provision of the gage recess *b* in the die face to define the center or parting line of the die, is of very great importance in indicating to the mechanic the elevations and depressions in the face of the die, especially where it is desired to produce dies of the lock or irregular surface type, as this obviates the tedious and highly skilled work required in making the necessary templets, laying out the die face outline, and laying out the outline on the side of the die block defining the depth of the impression in the block preparatory to facing off the block, and also obviates the very accurate milling machine manipulation required, to follow with the pointer, the depth line of the bottom of the impression, which depth line is laid out on the side of the block so that the facing-off cut will correspond to such line. For instance, in making the dies for a pair of ordinary eight inch shears by the old method it takes approximately 220 hours of highly skilled labor, while to make the dies with our improved method by which the exact center line or lock line of the die is designated, it takes approximately 46 hours of labor, which need not necessarily be of a highly skilled nature, it being a simple matter to remove the superfluous metal from the die face. With our method the danger of mistakes and errors is also minimized.

Having described our invention, what we claim is—

1. A hub or sinker, comprising a block, a shape formed thereon, a ledge which projects above the face of the block but lies below the face of the shape, and a gutter formed between said ledge and said shape.

2. A hub or sinker of the class described, comprising a block having a paternal shape formed thereon and a ledge surrounding said shape and forming a gutter therebetween, said ledge being of less depth than said shape.

3. A hub or sinker of the class described, comprising a block having a paternal shape or pattern thereon and a ledge surrounding the base portion of said shape and forming a gutter therebetween, the outer edge of said ledge being coincident with the center line of the shape.

4. A hub or sinker of the class described, comprising a block having a paternal shape thereon and a ledge surrounding said shape below its outer face and forming therewith a gutter, the outer wall of which extends away from the shape.

5. A hub or sinker of the class described, comprising a block having a paternal shape thereon and a ledge surrounding said shape with its outer edge terminating in coincident relation to the center or parting line of the shape entirely therearound, said ledge coöperating with the shape to form a gutter therebetween, the outer wall of which extends away from the shape.

6. A hub or sinker of the class described, having a shape or pattern and a ledge at the base portion of the shape, the latter to serve as a marker to leave an impression upon a die block to indicate the depth to which the top of the die block is to be dressed-off.

7. A hub or sinker of the class described, having a shape or pattern and a ledge surrounding the base portion of the shape, the latter to serve as a marker to indicate on a die block the depth to which the face should be dressed-off.

8. A hub or sinker of the class described, having a shape or pattern and a ledge at the base portion of the shape spaced therefrom to form a gutter therebetween and serving as a marker to leave an impression upon a die block to indicate the depth to which the top of the block has to be dressed-off and to serve as a means to force some of the displaced metal inward around the edge of the base of the shape.

9. A hub or sinker of the class described, having a shape or pattern and a ledge surrounding the base portion of the shape and spaced therefrom to form a gutter therebetween and serving as a marker to leave an impression upon a die block to indicate the depth to which the top of the die block is to be dressed-off.

10. A hub or sinker of the class described, having a shape or pattern and a ledge at the base portion of the shape spaced therefrom to form a gutter, the outer wall of which extends away from the inner wall, said ledge serving as a marker to leave an impression upon the die block to indicate the depth to which the top of the block is to be dressed-off.

11. A hub or sinker of the class described, having a shape or pattern and a ledge surrounding the base portion of the shape in spaced relation thereto to form an interposed gutter, the outer wall of which extends away from the inner wall, the shape adapted to produce a die having a lock or irregular center line and said ledge terminating at the center line and conforming to the irregularities thereof and adapted to serve as a marker to leave an impression upon a die block to indicate the depth to which the top of the block is to be dressed-off.

12. The method of forming dies, consisting in forcing into a metal block a hub or sinker to produce a die impression therein forming a marker impression at the side of the die impression to serve as a guide to indicate the depth to which the top of the die block is to be dressed, and then removing the face of the block to a depth determined by the marker impression.

13. The method of forming dies, consisting in forcing into a metal block a hub or sinker to produce a die impression therein, in the same operation forming a marker impression at the side of the die impresion to serve as a guide to indicate the depth to which the top of the die block is to be dressed, and then removing the face of the block to a depth determined by the marker impression.

14. The method of forming dies, consisting in forcing into a metal block a hub or sinker to produce a die impression therein, forming a marker impression around the die impression to serve as a guide to indicate the depth to which the top of the die block is to be dressed, and then removing the face of the block to a depth determined by the marker impression.

15. The method of forming dies, consisting in forcing into a hot metal block a hub or sinker to produce an impression of predetermined shape therein, forming a marker impression at the side of the die impression to serve as a guide to indicate the depth to which the top of the die block is to be dressed, and by the same operation forcing a part at least of the displaced metal inward to form a ridge around the edge of the die impression, and then removing the ridge and block face to a depth determined by the marker impression.

16. The method of forming dies, consisting in forcing into a metal block a hub or sinker to produce a die impression therein, by the same operation forming a marker impression at the side of the die impression to serve as a guide to indicate the depth to which the top of the die block is to be dressed and forcing a part at least of the displaced metal inward to form a ridge around the edge of the die impression, and then removing the ridge and block face to a depth determined by the marker impression.

17. The method of forming dies, consisting in forcing into a hot metal block a hub or sinker to produce a die impression therein having a lock or irregular center line, forming a marker impression around the die impression to serve as a guide to indicate the depth to which the top of the die block is to be dressed, to suit the lock or irregular center line of the die impression, and then removing the face of the block to a depth determined by the marker impression.

18. The method of forming dies, which consists in forcing into a hot metal block a hub or sinker to produce a die or impression therein having a lock or irregular center line, in the same operation forming a marker impression at the side of the die impression to serve as a guide to indicate the depth to which the top of the die block is to be dressed, and forcing a part of the displaced metal inward to form a ridge at the edge of the die impression without its center line, and then removing the face of the block to a depth determined by the marker impression.

In testimony whereof, we have hereunto signed our names to this specification.

JULIUS GIEBEL.
FRED H. ZIMMERMAN.